(12) United States Patent
Choi et al.

(10) Patent No.: US 10,250,802 B2
(45) Date of Patent: Apr. 2, 2019

(54) APPARATUS AND METHOD FOR PROCESSING WIDE VIEWING ANGLE IMAGE

(71) Applicant: FXGear Inc., Seoul (KR)

(72) Inventors: Kwang Jin Choi, Seoul (KR); Yeong Jun Park, Goyang-si (KR); Kyung Gun Na, Seoul (KR)

(73) Assignee: FXGear Inc., Seoul (KR)

( * ) Notice: Subject to any disclaimer, the term of this patent is extended or adjusted under 35 U.S.C. 154(b) by 0 days.

(21) Appl. No.: 14/539,927

(22) Filed: Nov. 12, 2014

(65) Prior Publication Data

US 2015/0181114 A1     Jun. 25, 2015

(30) Foreign Application Priority Data

Dec. 24, 2013  (KR) .................. 10-2013-0162585

(51) Int. Cl.
| | |
|---|---|
| *H04N 5/232* | (2006.01) |
| *G06T 3/00* | (2006.01) |
| *H04N 13/00* | (2018.01) |
| *H04N 13/04* | (2006.01) |

(52) U.S. Cl.
CPC ......... *H04N 5/23238* (2013.01); *G06T 3/005* (2013.01); *G06T 3/0043* (2013.01); *H04N 5/23248* (2013.01); *H04N 13/0011* (2013.01); *H04N 13/0033* (2013.01); *H04N 13/0459* (2013.01)

(58) Field of Classification Search
CPC .............. G06T 3/0043; H04N 13/0011; H04N 13/0033; H04N 13/0203; H04N 13/0459; H04N 5/23238; H04N 5/23248

USPC .......................... 348/36, 46, 208.4
See application file for complete search history.

(56) References Cited

U.S. PATENT DOCUMENTS

| | | | | |
|---|---|---|---|---|
| 6,438,266 B1 * | 8/2002 | Bajaj | ...................... | G06T 9/001 |
| | | | | 382/154 |
| 2002/0190987 A1 * | 12/2002 | Travers | .................. | G06T 15/04 |
| | | | | 345/427 |
| 2003/0043270 A1 * | 3/2003 | Rafey | .................... | H04N 5/222 |
| | | | | 348/157 |

(Continued)

FOREIGN PATENT DOCUMENTS

| | | |
|---|---|---|
| JP | 2003-69990 A | 3/2003 |
| JP | 2003-319418 A | 7/2003 |

(Continued)

OTHER PUBLICATIONS

Robert Kooima et. al, "Real-time digital dome rendering", 2008.*

*Primary Examiner* — Jamie J Atala
*Assistant Examiner* — James T Boylan
(74) *Attorney, Agent, or Firm* — Fenwick & West LLP

(57) ABSTRACT

An apparatus for processing a wide viewing angle image may include: a correction parameter generating unit for analyzing an image input from a camera to generate a correction parameter, a projection geometry generating unit for generating a projection geometry to output a wide viewing angle image by using the correction parameter, and a wide viewing angle image packaging unit for encoding the input image, the correction parameter and the projection geometry to generate a wide viewing angle image package. A method for processing a wide viewing angle image may be performed using the apparatus.

12 Claims, 19 Drawing Sheets

(56) References Cited

U.S. PATENT DOCUMENTS

| | | |
|---|---|---|
| 2004/0189876 A1 | 9/2004 | Shirato |
| 2005/0117019 A1* | 6/2005 | Lamboray ............... G06T 9/00 348/159 |
| 2005/0285875 A1* | 12/2005 | Kang ............... G06T 15/205 345/629 |
| 2008/0151053 A1 | 6/2008 | Ishii et al. |
| 2009/0009593 A1* | 1/2009 | Cameron ........... H04N 13/0459 348/51 |
| 2009/0315978 A1* | 12/2009 | Wurmlin ............... G06T 5/005 348/43 |
| 2010/0111489 A1* | 5/2010 | Presler ............... H04N 5/225 386/278 |
| 2010/0141733 A1* | 6/2010 | Borchers ............ H04N 5/2259 348/36 |
| 2012/0133780 A1* | 5/2012 | Zhang ............... G06T 7/0018 348/187 |
| 2012/0212398 A1* | 8/2012 | Border ............... G02B 27/017 345/8 |
| 2013/0106840 A1 | 5/2013 | Lee et al. |
| 2014/0118501 A1* | 5/2014 | Kim ................ H04N 13/0239 348/46 |
| 2014/0285676 A1* | 9/2014 | Barreto ............. H04N 17/002 348/187 |
| 2015/0110420 A1* | 4/2015 | Li ..................... G06T 15/20 382/285 |

FOREIGN PATENT DOCUMENTS

| | | | |
|---|---|---|---|
| JP | 2005-229529 A | | 8/2005 |
| JP | 2006-252423 | * | 9/2006 ............ G06T 15/00 |
| JP | 2006-252423 A | | 9/2006 |
| KR | 10-2012-0119774 A | | 10/2012 |
| KR | 10-2012-0133041 A | | 12/2012 |
| KR | 10-2013-0043300 A | | 4/2013 |
| WO | WO 2014/005297 A1 | | 1/2014 |

* cited by examiner

APPARATUS AND METHOD FOR PROCESSING WIDE VIEWING ANGLE IMAGE

CROSS-REFERENCE TO RELATED APPLICATION

This application claims priority to Korean Patent Application No. 10-2013-0162585, filed on Dec. 24, 2013, and all the benefits accruing therefrom under 35 U.S.C. § 119, the contents of which in its entirety are herein incorporated by reference.

BACKGROUND

1. Field

The present disclosure relates to an apparatus and method for processing a wide viewing angle image, and more particularly, to an apparatus and method for processing an image, which renders a wide viewing angle image by using a projection geometry corrected with a camera intrinsic parameter.

2. Description of the Related Art

Generally, when photographing an image by using an optical device such as a camera and displaying the photographed image, a distortion occurs in the image due to hardware problems of the camera such as lens distortion. When the image is to be displayed, the image distortion should be corrected so that the image appears natural.

Conventionally, when a distortion occurs in an image, the image distortion has been corrected before the image is being displayed. However, this method has a greater burden on image processing.

In addition, in case of camera stabilization for a video at hand-held recording, if the video is corrected before being displayed, the burden on image processing increases. In the conventional technique for correcting image distortion or for camera stabilization, an image should be processed in advance in an image area before the image is watched, which needs a significant amount of processing and time.

SUMMARY

The present disclosure is directed to providing an apparatus and method capable of performing operations required for distortion correction of an image or camera stabilization in real time when the image is being displayed.

An apparatus for processing a wide viewing angle image according to an embodiment includes: a correction parameter generating unit for analyzing an image input from a camera to generate a correction parameter; and a wide viewing angle image packaging unit for encoding the input image and the correction parameter to generate a wide viewing angle image package.

According to an embodiment, the apparatus for processing a wide viewing angle image further includes a projection geometry generating unit for generating a projection geometry to output a wide viewing angle image by using the correction parameter, wherein the wide viewing angle image packaging unit is configured to generate the wide viewing angle image by further encoding the projection geometry.

In addition, in the apparatus for processing a wide viewing angle image according to an embodiment, the correction parameter may include a camera intrinsic parameter or a stabilizing parameter.

In addition, in the apparatus for processing a wide viewing angle image according to an embodiment, the projection geometry generating unit may be configured to correct a vertex or a texture coordinate of a reference geometry by using the camera intrinsic parameter, and to transform the corrected reference geometry into a curved shape to generate the projection geometry.

In addition, the apparatus for processing a wide viewing angle image according to an embodiment may further include a first communication unit for providing the wide viewing angle image package to another device.

A wide viewing angle image display device according to another embodiment includes: a second communication unit for receiving the wide viewing angle image package provided from the first communication unit; and a scene composing unit for decoding the received wide viewing angle image package to obtain a projection geometry for outputting a wide viewing angle image, projecting the projection geometry to a virtual space, disposing a virtual camera, and texturing the input image to the projected projection geometry to compose a scene.

In the wide viewing angle image display device according to another embodiment, the correction parameter may include a camera intrinsic parameter or a stabilizing parameter.

In the wide viewing angle image display device according to another embodiment, the scene composing unit may be configured to correct the scene by dynamically adjusting a location of the virtual camera by using the stabilizing parameter.

In the wide viewing angle image display device according to another embodiment, the scene composing unit may be configured to correct the scene by dynamically adjusting a vertex of the projection geometry projected to the virtual space by using the stabilizing parameter.

The wide viewing angle image display device according to another embodiment may further include a display unit for rendering and displaying the scene in real time.

In the wide viewing angle image display device according to an embodiment, the camera may be a stereo camera, and the correction parameter may further include an inter-camera instrumental error correction parameter, a color correction parameter or an exposure correction parameter.

In the wide viewing angle image display device according to an embodiment, the scene composing unit may correct the scene by dynamically adjusting the virtual camera or a vertex of the projection geometry projected to the virtual space by using the instrumental error correction parameter.

In the wide viewing angle image display device according to another embodiment, the wide viewing angle image display device may be a wearable device or a portable communication device.

A method for processing a wide viewing angle image according to another embodiment includes: analyzing an image input from a camera to generate a correction parameter; and encoding the input image and the correction parameter to generate a wide viewing angle image package.

According to another embodiment, the method for processing a wide viewing angle image further includes generating a projection geometry to output a wide viewing angle image by using the correction parameter, wherein in said generating of the wide viewing angle image package, the projection geometry is further encoded.

In the method for processing a wide viewing angle image according to another embodiment, the correction parameter may include a camera intrinsic parameter or a stabilizing parameter.

In the method for processing a wide viewing angle image according to another embodiment, the generating of a geometry may include: correcting a vertex or a texture coordinate of a reference geometry by using the camera intrinsic parameter; and when the vertex of the reference geometry is corrected, transforming the corrected reference geometry into a curved shape to generate the projection geometry.

The method for processing a wide viewing angle image according to another embodiment may further include analyzing the input image to extract metadata, and in the generating of a wide viewing angle image package, the metadata may be further encoded.

The method for processing a wide viewing angle image according to another embodiment may further include: decoding the wide viewing angle image package to project the projection geometry to a virtual space, and disposing a virtual camera; and texturing the input image to the projected projection geometry to compose a scene.

The method for processing a wide viewing angle image according to another embodiment may further include correcting the scene by dynamically adjusting a location of the virtual camera by using the stabilizing parameter.

The method for processing a wide viewing angle image according to another embodiment may further include correcting the scene by dynamically adjusting a vertex of the projection geometry projected to the virtual space by using the stabilizing parameter.

The method for processing a wide viewing angle image according to another embodiment may further include rendering and displaying the scene data in real time.

In the method for processing a wide viewing angle image according to another embodiment, the input image may be a stereo image input by a stereo camera, and the correction parameter may further include an inter-camera instrumental error correction parameter, a color correction parameter or an exposure correction parameter.

According to an embodiment, correction of lens distortion and camera stabilization are performed in a three-dimensional space, instead of an image area. Therefore, it is possible to perform three-dimensional rendering and an image may be processed in real time at a rendering stage when being displayed, without being preprocessed.

In addition, since a three-dimensional projection geometry transformed by using a camera intrinsic parameter is generated for encoding, the burden on data processing may be reduced. Moreover, in a scene composing and rendering stage, the burden on data processing may also be reduced since distortion is corrected by using a three-dimensional projection geometry or a virtual camera of a three-dimensional virtual space with a stabilizing parameter generated by using a camera intrinsic parameter.

DETAILED DESCRIPTION

Figure 1:
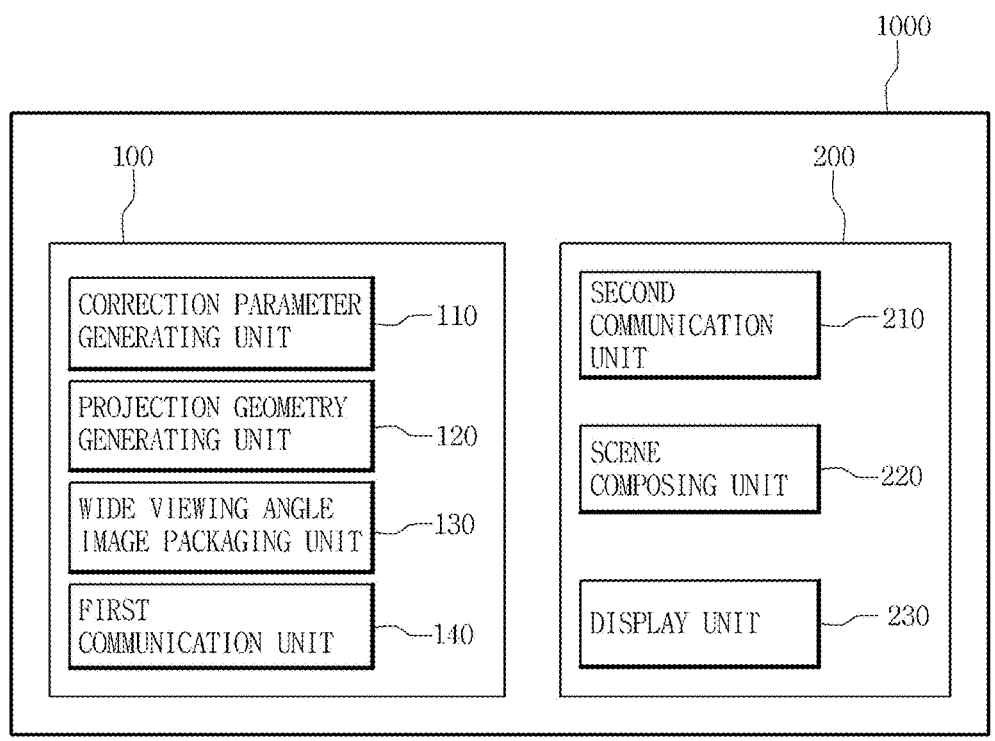
FIG. 1 is a block diagram showing a wide viewing angle image processing system according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. In the drawings, like reference numerals denote like elements. However, in the description, details of well-known features and techniques may be omitted to avoid unnecessarily obscuring the presented embodiments. In addition, the shape, size and regions, and the like, of the drawing may be exaggerated for clarity and may not mean the actual dimension.

The embodiments described in the specification may be implemented as hardware entirely, hardware partially and software partially, or software entirely. In the specification, the term "unit", "module", "device", "system" or the like indicates a computer-related entity like hardware, a combination of hardware and software, or software. For example, the term "unit", "module", "device", "system" or the like used in the specification may be a process, a processor, an object, an executable file, a thread of execution, a program, and/or a computer, without being limited thereto. For example, both a computer and an application executed on the computer may correspond to the term "unit", "module", "device", "system" or the like in the specification.

The embodiments have been described with reference to the flowchart shown in the figure. For brief explanation, the method has been illustrated and described as a series of blocks, but the present disclosure is not limited to the order of the blocks. In other words, some blocks may be executed simultaneously with other blocks or in a different order from those illustrated and described in this specification, and various diverges, flow paths, block sequences may also be implemented if they give the equivalent or similar results. In addition, in order to implement the method described in the specification, it is also possible not to demand all blocks. Further, the method may be implemented in the form of a computer program for executing a series of processes, and the computer program may also be recorded on a non-transitory computer-readable recording medium.

Hereinafter, embodiments will be described in detail with reference to the drawings.

FIG. 1 is a block diagram showing a wide viewing angle image processing system 1000 according to an embodiment. The wide viewing angle image processing system 1000 may include a wide viewing angle image processing apparatus 100 and/or a wide viewing angle image display device 200, and the apparatus 100 and the device 200 may be integrated into a single unit or separated from each other. In addition, in an embodiment, if the apparatus 100 and the device 200 are provided as separate units, they may perform data communication through a wired or wireless network.

In an embodiment, the wide viewing angle image processing apparatus 100 may include a correction parameter generating unit 110, a projection geometry generating unit 120, and a wide viewing angle image packaging unit 130. In another embodiment, the wide viewing angle image processing apparatus 100 may further include a first communication unit 140.

The correction parameter generating unit 110 may analyze an image input from a camera to generate a correction parameter. In an embodiment, the camera (not shown) may be included in the wide viewing angle image processing apparatus 100, and the camera may be a monocle camera or a stereo camera having a wide viewing angle, a panorama, a fisheye lens or the like.

Through the camera, an image obtained by photographing a subject and another image obtained by photographing a reference grid may be input to the wide viewing angle image processing apparatus 100. The reference grid is a reference sample for image analysis, for example a square monochrome grid pattern. The image obtained by photographing a subject may be corrected based on the reference grid.

The correction parameter generating unit 110 may analyze the input image (the image obtained by photographing a subject and an image obtained by photographing the reference grid) and generate a camera intrinsic parameter and a stabilizing parameter. The camera intrinsic parameter is a parameter related to a mechanical error of the camera lens, and the stabilizing parameter is a parameter generated by applying the camera intrinsic parameter to the subject-photographed image. The stabilizing parameter is a parameter for correcting artifacts such as hand tremor and includes a temporal element.

The projection geometry generating unit 120 may generate a projection geometry for outputting a wide viewing angle image by using the correction parameter generated by the correction parameter generating unit 110. For example, the projection geometry generating unit 120 may correct the reference geometry having a planar grid form into a projection geometry for outputting a wide viewing angle image. In detail, the projection geometry generating unit 120 may correct a vertex or a texture coordinate of the reference geometry by using the camera intrinsic parameter, and then generate a projection geometry for outputting a wide viewing angle image by transforming the corrected geometry into a curved shape. Transformation and projection of geometry according to correction of a vertex or texture coordinate and texturing of an image will be described below in more detail.

The wide viewing angle image packaging unit 130 may generate a wide viewing angle image package by encoding the image input to the wide viewing angle image processing apparatus 100 and the generated correction parameter. In an embodiment, the wide viewing angle image packaging unit 130 may perform the encoding by further including the generated projection geometry in the wide viewing angle image package. In the above description, the input image may be an image corrected by further using another parameter in addition to the camera intrinsic parameter. In addition, in another embodiment, the wide viewing angle image packaging unit 130 may perform the encoding by further including metadata in the input image.

The first communication unit 140 may provide the wide viewing angle image package to another device. The first communication unit 140 may provide an image package through a wired or wireless network, and here, any wireless communication method may be used. Further, another device mentioned above may be a device in or out of the wide viewing angle image processing system 1000, or any module included in the wide viewing angle image processing apparatus 100.

In another embodiment, the wide viewing angle image display device 200 may receive the wide viewing angle image package generated by the wide viewing angle image processing apparatus 100 and displays the wide viewing angle image through a display device.

For this purpose, as shown in FIG. 1, the wide viewing angle image display device 200 may include a second communication unit 210, a scene composing unit 220 and a display unit 230 in one embodiment. In an embodiment, the second communication unit 210 may receive a wide viewing angle image package through a wired or wireless network. In another embodiment, the second communication unit 210 may directly receive the wide viewing angle image package generated by the wide viewing angle image packaging unit 130. For example, the wide viewing angle image processing apparatus 100 and the wide viewing angle image display device 200 may be integrated into a single unit. The second communication unit 210 may deliver the received wide viewing angle image package to the scene composing unit 220.

The scene composing unit 220 may decode the received (delivered) wide viewing angle image package in real time. If the projection geometry is included in the wide viewing angle image package, the scene composing unit 220 may obtain the projection geometry by decoding the wide viewing angle image package. If the projection geometry is not included in the wide viewing angle image package, the scene comprising unit 220 may first obtain the correction parameter from the wide viewing angle image package, and then, obtain the projection geometry by correcting a reference geometry by using the correction parameter. When the projection geometry is obtained, the scene composing unit 220 may project the projection geometry in a virtual space, and dispose a camera in the virtual space. Then, the input image may be textured to the projected projection geometry to compose a scene. The scene composing unit 220 may project the projection geometry onto a spherical surface in the virtual space. In other words, the projection geometry is a projection geometry corrected based on the camera intrinsic parameter. The geometry is a projection geometry corrected in the unit of vertex or having a corrected texture coordinate.

Figure 2A:
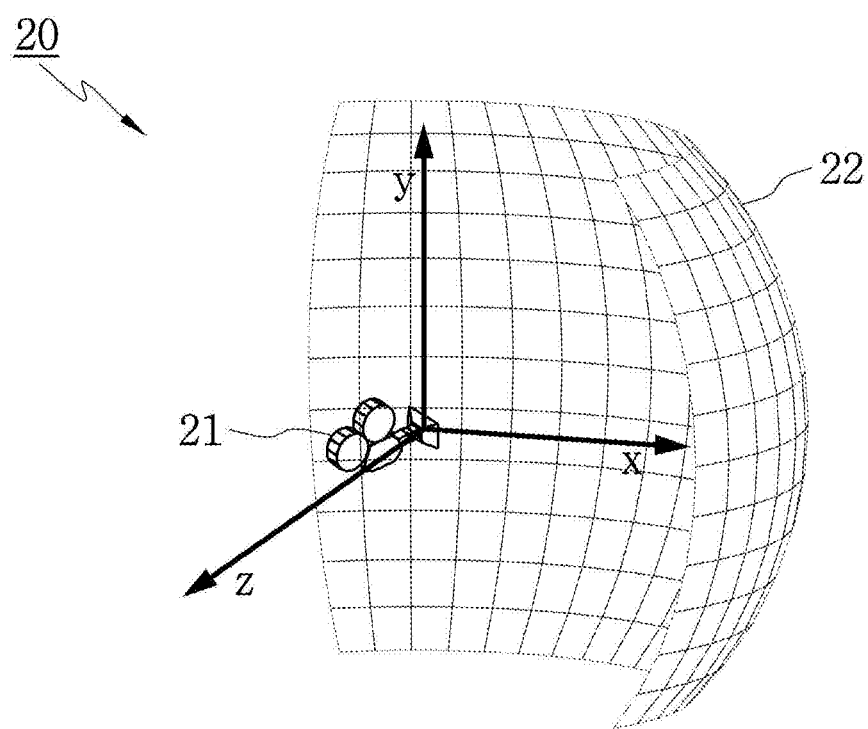
FIGS. 2A and 2B are diagrams for illustrating a process of generating a scene by a scene composing unit.
Figure 2B:
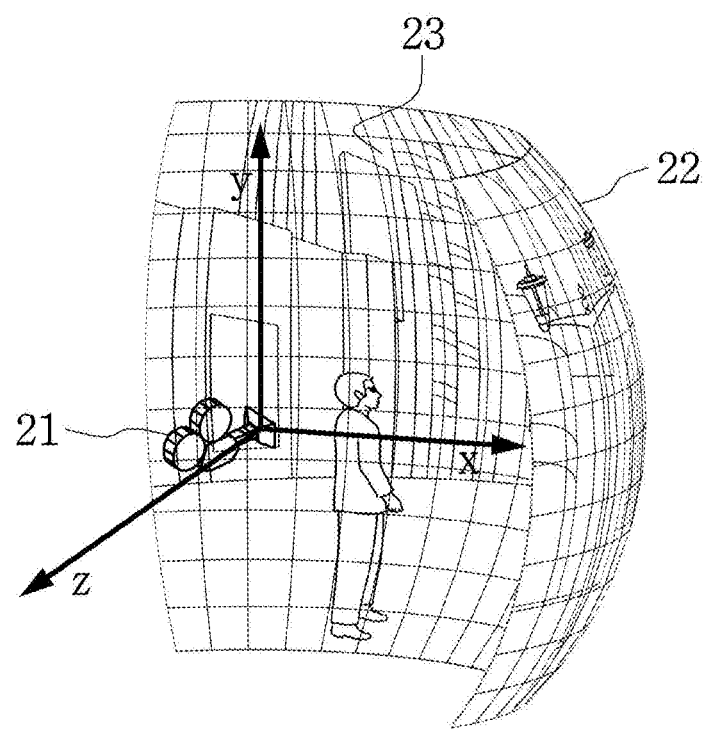

FIGS. 2A and 2B are diagrams for illustrating a process of generating a scene by a scene composing unit 220. Referring to FIG. 2A, the scene composing unit 220 disposes a virtual camera 21 for rendering in a virtual space 20 and projects a projection geometry in the virtual space 20. For example, as shown in FIG. 2A, the scene composing unit 220 projects the projection geometry onto a spherical surface 22 formed at the virtual space 20. Then, as shown in FIG. 2B, an image 23 is textured to the projected projection geometry to compose a scene. In addition, the display unit 230 renders the scene in real time and displays the rendered scene at a display device (not shown). In another embodiment, in order to correct artifacts caused by a distortion of an eyepiece lens of the display device, an additional correction module may be further included in the wide viewing angle image display device 200.

In still another embodiment, the projection geometry generating unit 120 included in the wide viewing angle image processing apparatus 100 may correct a vertex or a texture coordinate of a reference projection geometry by using the camera intrinsic parameter and generate a projection geometry used for rendering by transforming the corrected reference projection geometry into a curved shape. As used herein, the projection geometry refers to a projection geometry which is used for rendering the photographed image, and the reference projection geometry refers to a projection geometry template which serves as a sample for generating the projection geometry.

Figure 3A:
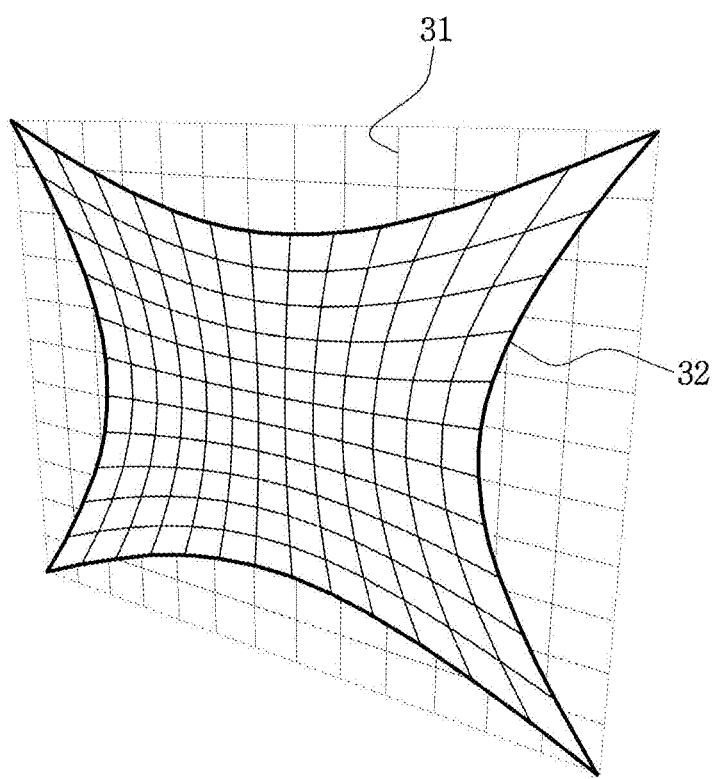
FIGS. 3A to 3E are diagrams illustrating geometry projection and texturing based on a vertex converting of the geometry according to an embodiment.

FIGS. 3A to 3E are diagrams for illustrating geometry projection and texturing based on a vertex converting of the projection geometry according to an embodiment. In an embodiment, the projection geometry generating unit 120 may generate a corrected projection geometry by transforming a vertex of the reference projection geometry by using the camera intrinsic parameter. Referring to FIG. 3A, the reference projection geometry 31 is depicted together for the comparison with the generated projection geometry 32. Referring to FIG. 3A, the projection geometry 32 having a converted vertex has a curved corner which is compressed based on its center. If the projection geometry 32 generated as described above is textured, as shown in FIG. 3B, the textured image 33 is shown without a distortion. For example, a straight line of a subject is also shown as a straight line in the textured image.

Figure 3B:
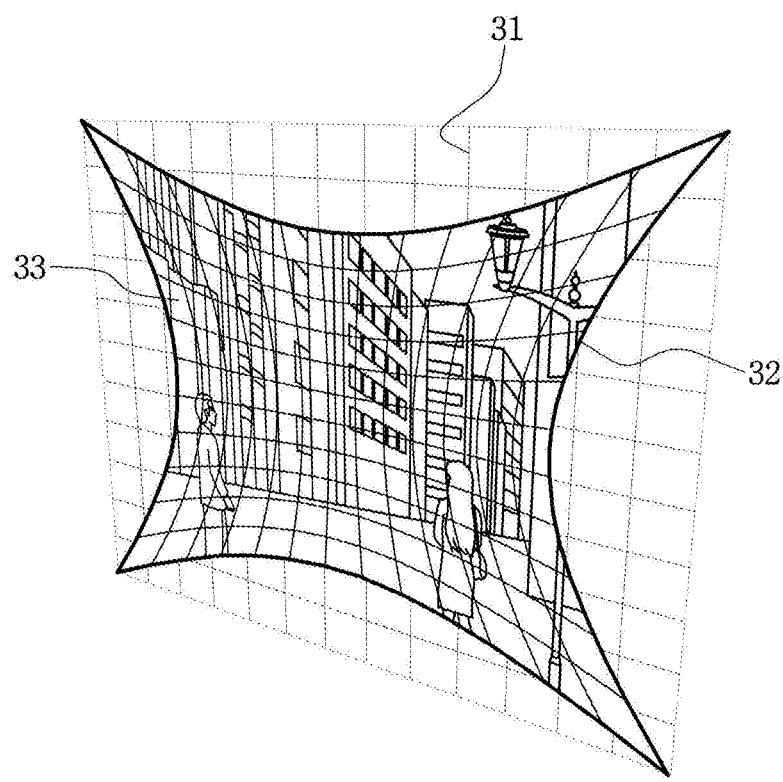
Figure 3C:
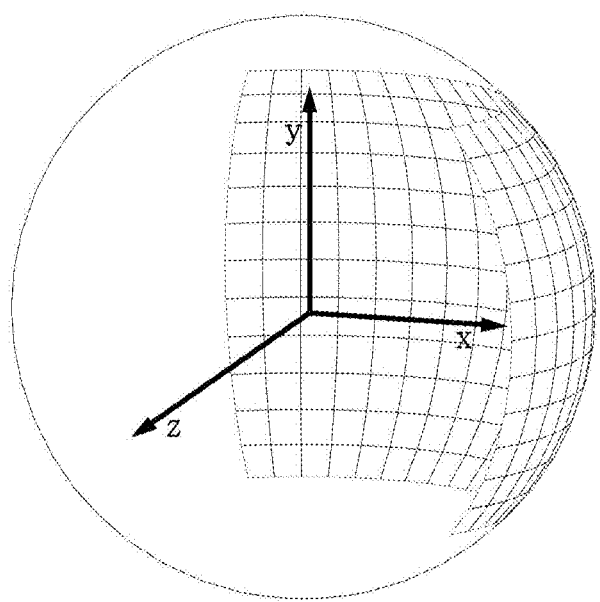
Figure 3D:
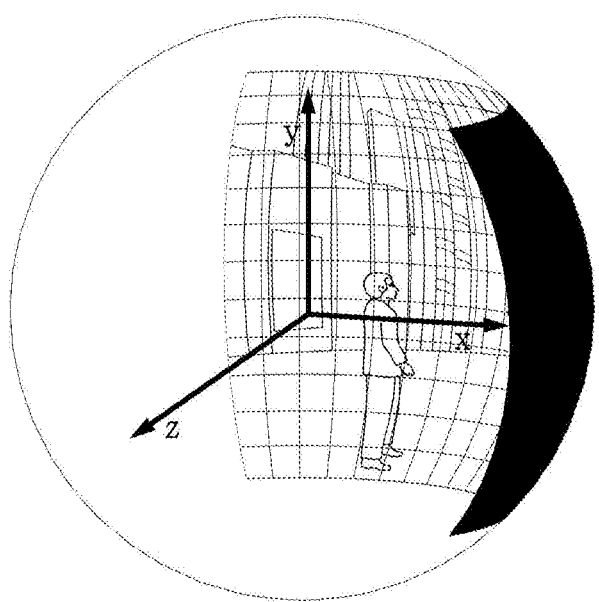
Figure 3E:
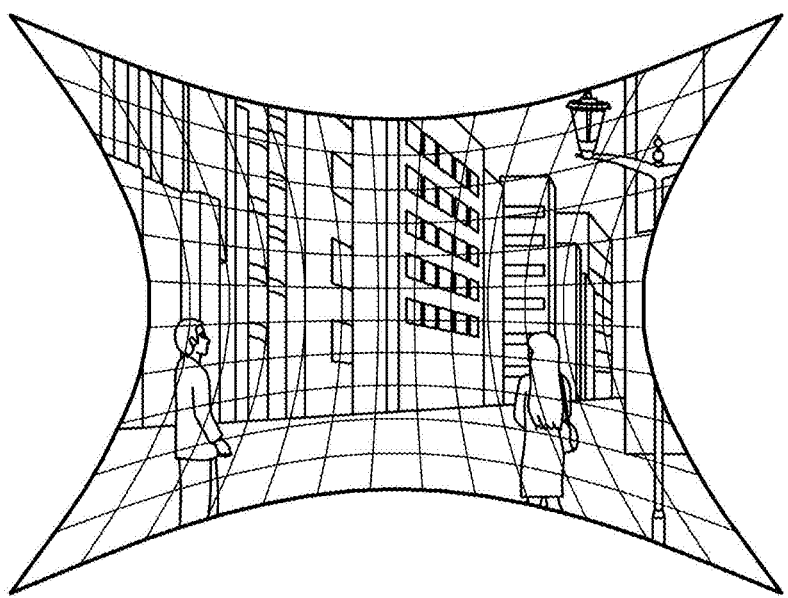

Referring to FIGS. 3C and 3D, the scene composing unit 220 disposes the projection geometry 32 in a virtual space. In this case, by projecting the projection geometry to an arbitrary spherical surface in the virtual space, the projection geometry having a concave curve as shown in FIG. 3B may be spread out as shown in FIGS. 3C and 3D. FIG. 3D shows a state where a photographed image is textured to the projected projection geometry. And, FIG. 3E shows a state where the textured image is displayed at the front with the same view angle as that of the camera when the image is photographed.

Figure 4A:
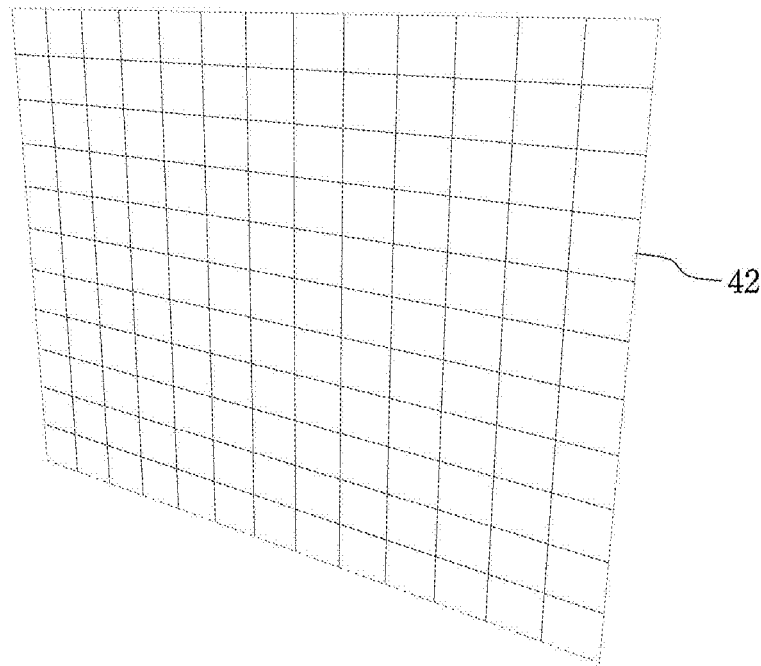
FIGS. 4A to 4E are diagrams illustrating geometry projection and texturing in a texture coordinate converting of the geometry according to an embodiment.
Figure 4B:
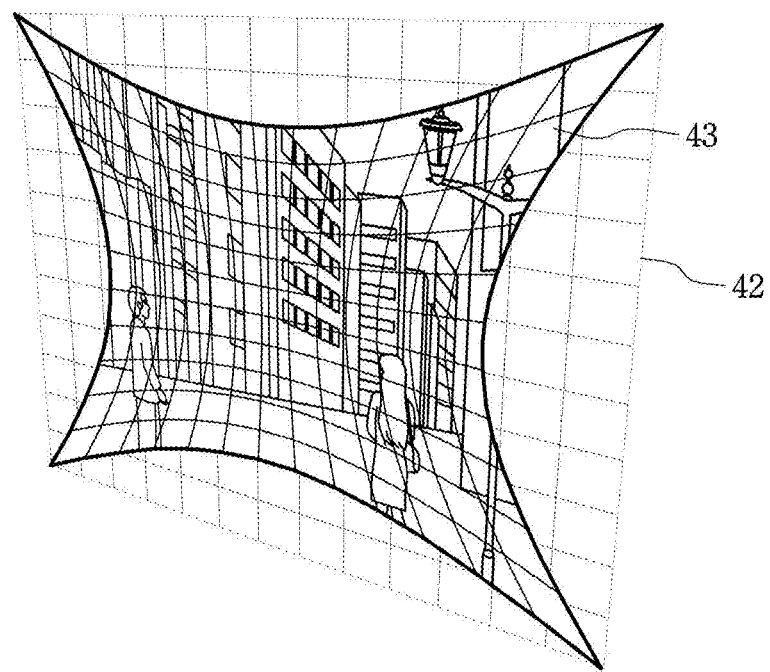

FIGS. 4A to 4E are diagrams illustrating geometry projection and texturing in a texture coordinate converting of the geometry according to an embodiment. The texture coordinate is a coordinate at which an image is textured, and has no relation with the projection geometry. Therefore, as shown in FIG. 4A, in the projection geometry 42, the shape of the reference projection geometry does not change. However, if an image 43 is textured to the projection geometry 42, as shown in FIG. 4B, the image textured to the projection geometry does not have a rectangular shape but is distorted inwards.

Figure 4C:
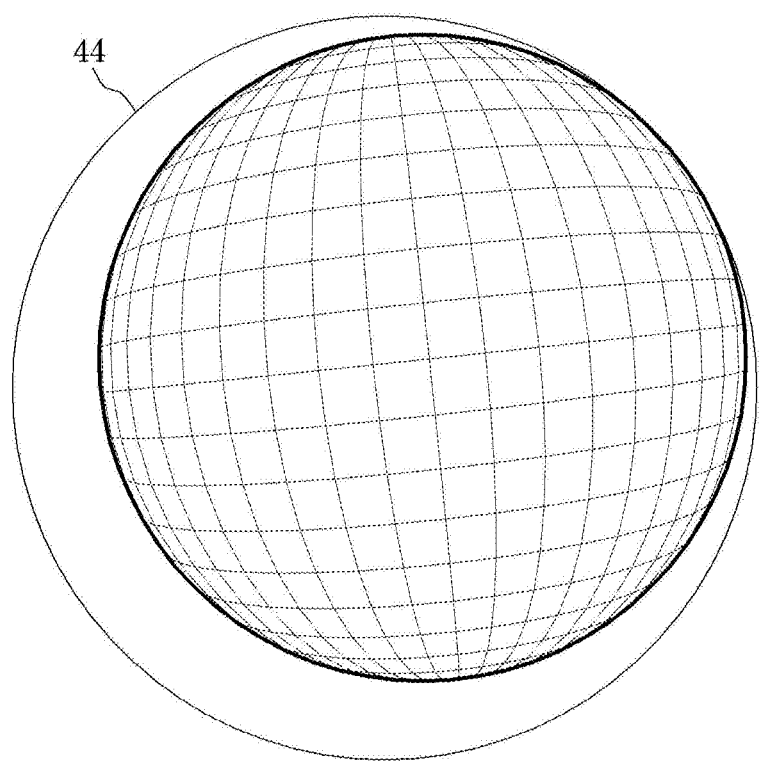
Figure 4D:
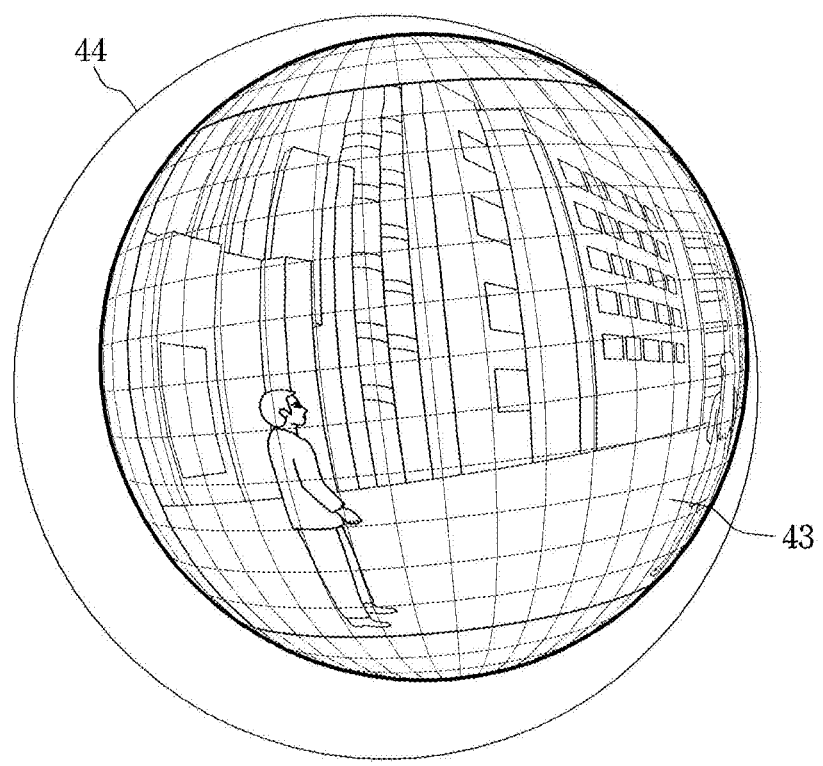
Figure 4E:
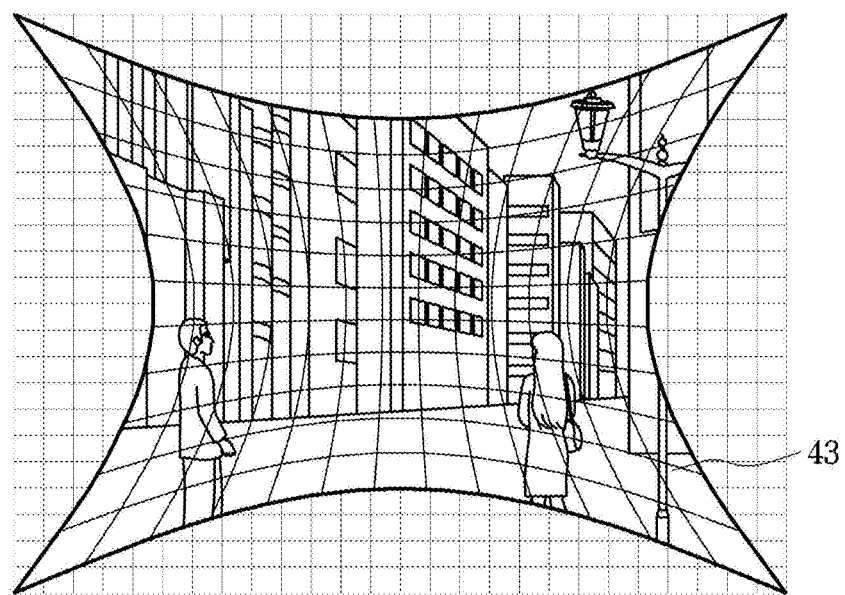

Referring to FIG. 4C, the projection geometry 42 having a corrected texture coordinate is disposed on a spherical surface 44 in the virtual space, and the image is textured to the projection geometry 42 and rendered so that the image is output as shown in FIG. 4D. In addition, FIG. 4E shows that the textured image 43 is displayed at the front with the same view angle as that of the camera when the image is photographed. Through this process, the wide viewing angle image may be expressed on the spherical surface in the virtual space without any distortion.

In another embodiment, the scene composing unit 220 may correct the scene by dynamically adjusting a location of the virtual camera in the virtual space by using the correction parameter (for example, the stabilizing parameter) so that the corrected image may be rendered.

Figure 5:
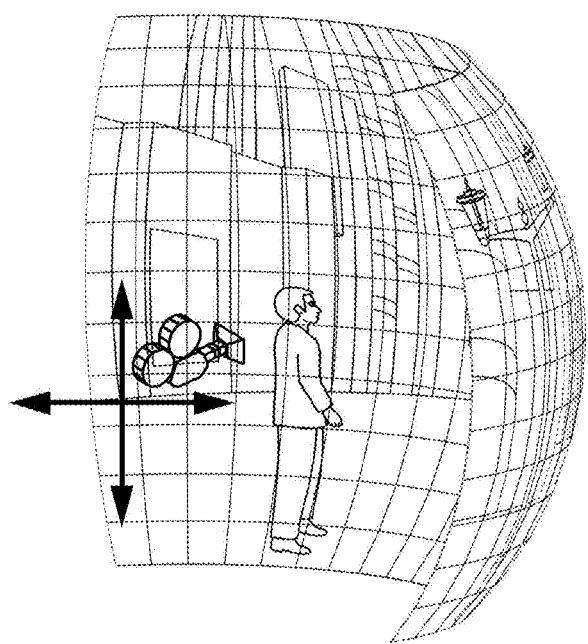
FIG. 5 is a diagram showing an example of a scene corrected by adjusting a location of a virtual camera according to an embodiment.

FIG. 5 is a diagram showing an example of a scene corrected by adjusting a location of a virtual camera according to an embodiment. Referring to FIG. 5, the scene composing unit 220 may correct the scene by dynamically adjusting a location of the virtual camera based on the correction parameter. Even though FIG. 5 shows just upper, lower, right and left directions, the image rendered may be moved to any location in the three-dimensional virtual space for correction.

Figure 6:
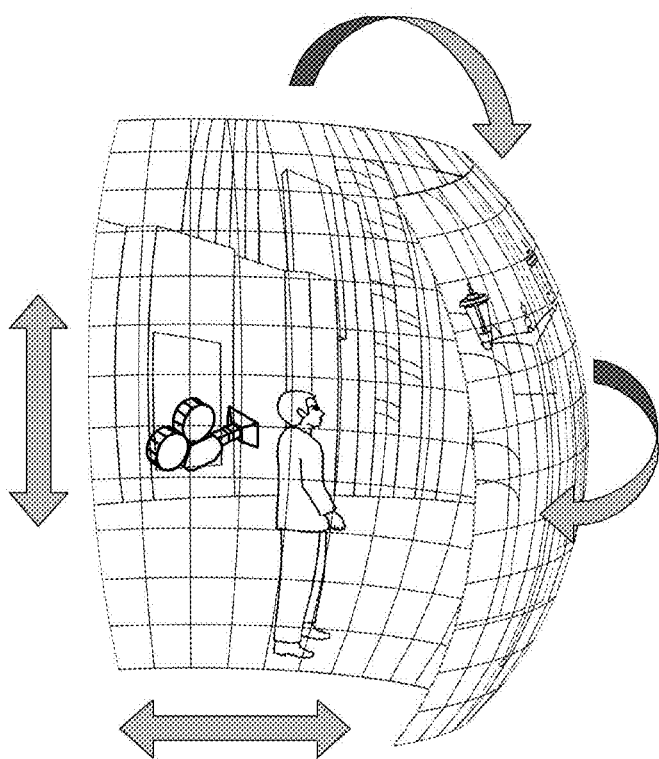
FIG. 6 is a diagram showing an example of a scene corrected by converting the geometry according to an embodiment.

FIG. 6 is a diagram showing an example of a scene corrected by converting the projection geometry according to an embodiment. Referring to FIG. 6, in an embodiment, the scene composing unit 220 may correct the scene by converting the projection geometry in a state where the virtual camera is fixed. For example, as shown in FIG. 6, the projection geometry may be moved in upper, lower, right and left directions, or in a yawing, pitching or rolling direction.

In another embodiment, the scene composing unit 220 may correct the scene by adjusting the virtual camera and the projection geometry together. This scene correction may be performed in real time together with image rendering.

In an embodiment, the camera may be a stereo camera. When the wide viewing angle image processing apparatus 100 receives a stereo image from the stereo camera, the correction parameter generating unit 110 may generate an inter-camera instrumental error correction parameter, a color correction parameter or an exposure correction parameter. In other words, the above parameters may be included in the correction parameter.

In this case, the scene composing unit 220 may correct the scene by adjusting a vertex of the projection geometry projected in the virtual space or the virtual camera by further using the instrumental error correction parameter in addition to the stabilizing parameter. For example, when composing a scene by using the instrumental error correction parameter, the scene composing unit 220 may statically adjust the projection geometry or the virtual camera to correct a mechanical error. In other words, the scene composing unit 220 may stabilize the scene with regard to time by using the stabilizing parameter and correct a mechanical error between stereo cameras by using the instrumental error correction parameter to provide a real-time image of higher quality.

In an embodiment, the wide viewing angle image processing apparatus 100 and the wide viewing angle image display device 200 may be a server, a personal computer, a laptop, a tablet PC, a smart phone or the like, and these devices may include a camera. In particular, the wide viewing angle image display device 200 may be a wearable device or any portable communication device.

Figure 7:
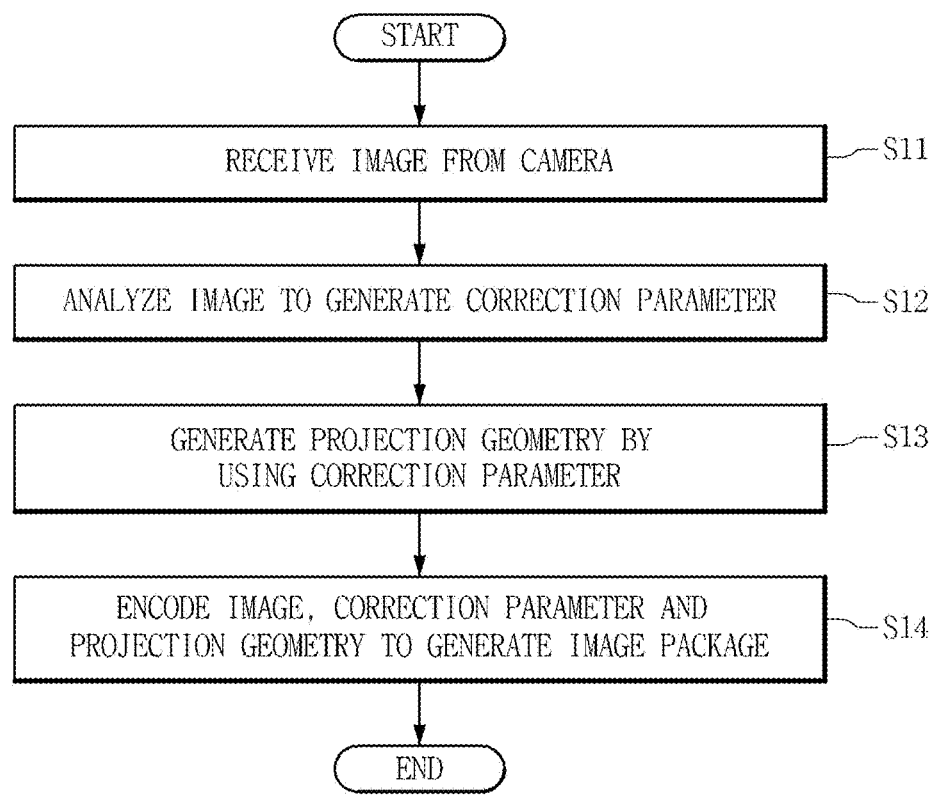
FIG. 7 is a flowchart illustrating a method for processing a wide viewing angle image according to an embodiment.

FIG. 7 is a flowchart illustrating a method for processing a wide viewing angle image according to an embodiment. Referring to FIG. 7, the method for processing a wide viewing angle image includes receiving an image from a camera (S11), analyzing the received image to generate a correction parameter (S12), generating a projection geometry for outputting a wide viewing angle image by using the correction parameter (S13), and encoding the input image, the correction parameter and the projection geometry to generate a wide viewing angle image package (S14). In an embodiment, the projection geometry may be omitted from the wide viewing angle image package. Further, the correction parameter generated in S12 may include a camera intrinsic parameter or a stabilizing parameter.

In another embodiment, the camera intrinsic parameter method for processing a wide viewing angle image may further include a step of transmitting the generated wide viewing angle image package to another device.

Figure 8:
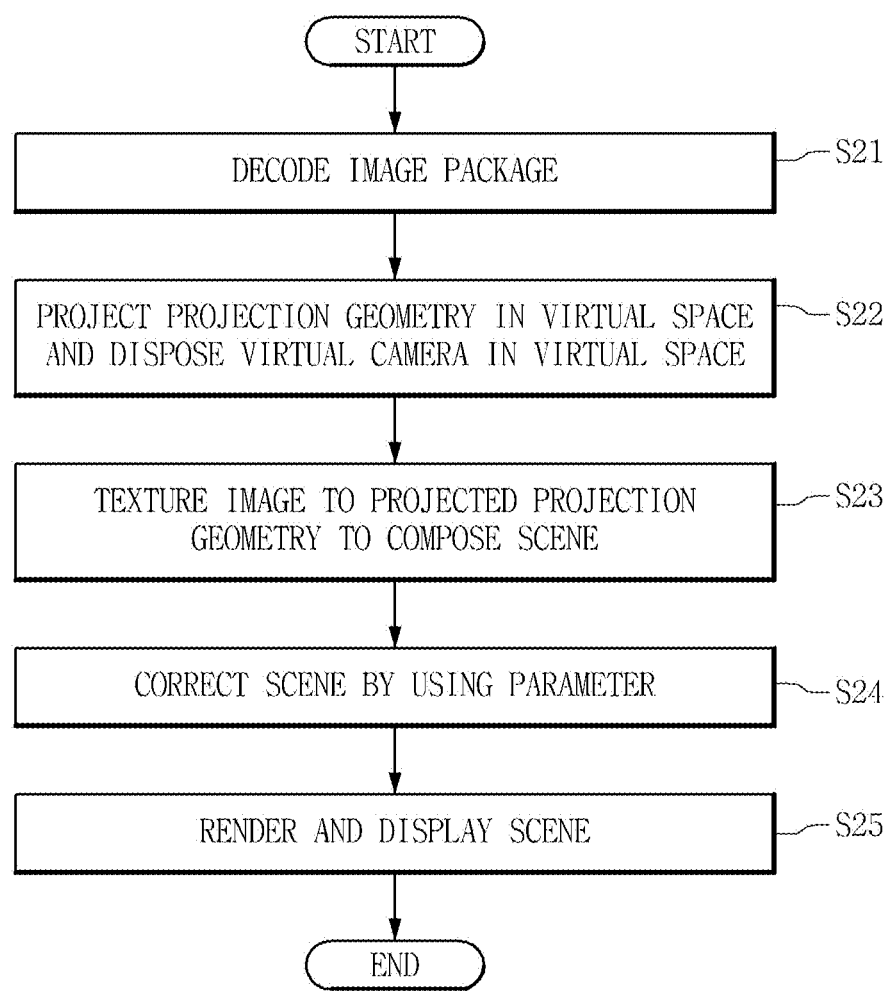
FIG. 8 is a flowchart illustrating a method for processing a wide viewing angle image according to another embodiment.

FIG. 8 is a flowchart illustrating a method for processing a wide viewing angle image according to another embodiment. Referring to FIG. 8, the method for processing a wide viewing angle image may be performed independently or after the method for processing a wide viewing angle image as illustrated in FIG. 7.

The method for processing a wide viewing angle image according to another embodiment as illustrated in FIG. 8 may include receiving a wide viewing angle image package and decoding the wide viewing angle image package (S21), projecting a projection geometry in a virtual space and disposing a virtual camera in the virtual space (S22), texturing the image to the projected projection geometry to compose a scene (S24), correcting the scene by using the parameter (S24), and rendering and displaying the corrected scene (S25). In an embodiment, S23 to S25 may be dynamically performed simultaneously.

If the projection geometry is not included in the wide viewing angle image package, a step of correcting a reference geometry by using the correction parameter to obtain the projection geometry may further be included between steps S21 and S22. In addition, the method for processing a wide viewing angle image according to an embodiment may further include a step of correcting the scene by dynamically adjusting a location of the virtual camera by using the correction parameter (for example, the stabilizing parameter). Also, in another embodiment, the method for processing a wide viewing angle image may further include a step of correcting the scene by dynamically adjusting the projection geometry by using the correction parameter (for example, the stabilizing parameter).

In another embodiment, the method for processing a wide viewing angle image may further include a step of analyzing the input image to extract metadata, and in this case, the step of generating a wide viewing angle image package may further encode the metadata.

Figure 9:
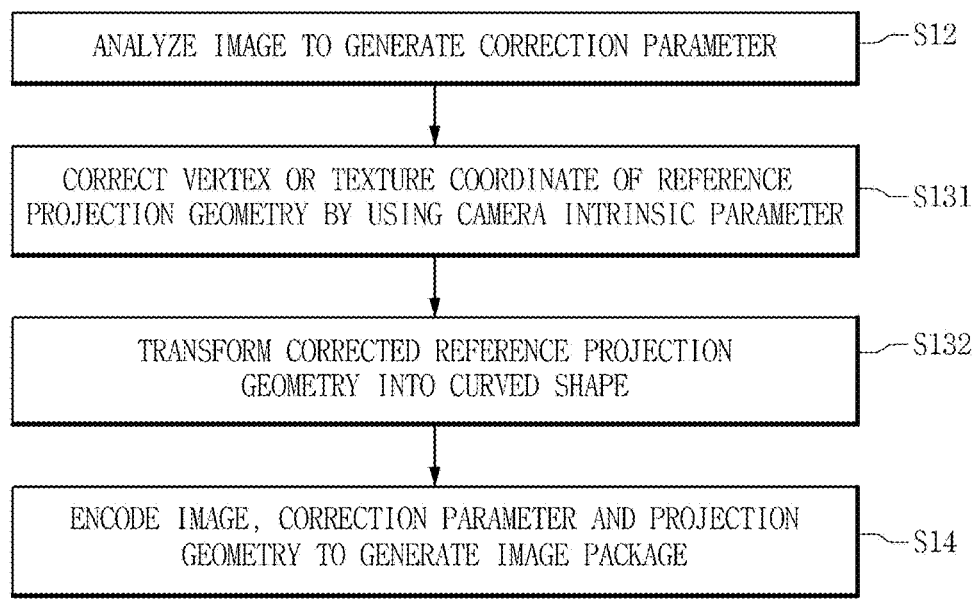
FIG. 9 is a flowchart illustrating a geometry generating step according to an embodiment.

FIG. 9 is a flowchart illustrating a geometry generating step according to an embodiment. Referring to FIG. 9, after step S12 described above, in order to generate a projection geometry for outputting the wide viewing angle image by using the correction parameter, a step of correcting a vertex or a texture coordinate of the reference projection geometry by using the camera intrinsic parameter (S131) and a step of generating the projection geometry by transforming the corrected reference projection geometry into a curved shape (S132) may be further performed. In step S132, as described above with reference to FIG. 5, the shape of the projection geometry is transformed by converting the vertex of the projection geometry. Therefore, if a projection geometry having a corrected texture coordinate is used, the shape of the projection geometry is not changed, but only the texture coordinate included in the projection geometry is changed. Step S14 is then performed following the transformation of the corrected reference projection geometry into the curved shape in step S132.

Figure 10:
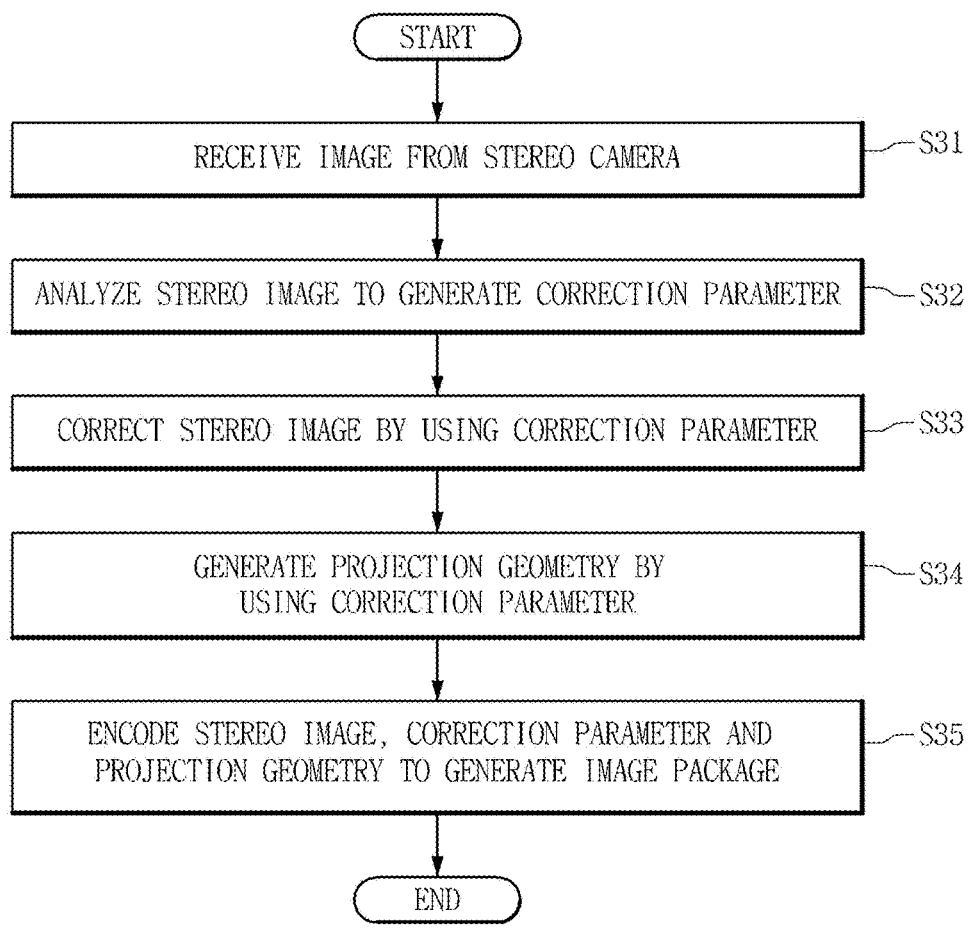
FIG. 10 is a flowchart illustrating a method for processing a wide viewing angle image according to another embodiment.

FIG. 10 is a flowchart illustrating a method for processing a wide viewing angle image according to another embodiment. The method for processing a wide viewing angle image, depicted in FIG. 10, is directed to a method for rendering and displaying an image photographed by using a stereo camera. The method for processing a wide viewing angle image, depicted in FIG. 10, may include receiving an image from a stereo camera (S31), analyzing the input stereo image to generate a correction parameter (S32), correcting the stereo image by using the correction parameter (S33), generating a projection geometry by using the correction parameter (S34), and generating an image package by encoding the stereo image, the correction parameter and the projection geometry (S35). In another embodiment, S33 may be omitted. In S32, the correction parameter may further include an inter-camera instrumental error correction parameter, a color correction parameter or an exposure correction parameter.

In another embodiment, the wide viewing angle image package produced by the method for processing a wide viewing angle image, described above with reference to FIG. 10 may be decoded and displayed at a display device. In this case, the scene which is being rendered may be corrected by changing a location of the virtual camera or a projection geometry projected to the virtual space.

Though the present disclosure has been described with reference to the embodiments depicted in the drawings, it is just an example, and it should be understood by those skilled in the art that various modifications and equivalents can be made from the disclosure. However, such modifications should be regarded as being within the scope of the present disclosure. Therefore, the true scope of the present disclosure should be defined by the appended claims.

What is claimed is:

1. An apparatus for processing a wide viewing angle image and providing the wide viewing angle image to a display device, comprising:

a correction parameter generating processor configured to analyze an image input from a camera and a planar reference image to generate a correction parameter based on the analysis of the image input and the planar reference image;

a wide viewing angle image packaging processor configured to encode the input image and the correction parameter to generate a wide viewing angle image package; and a first communication processor configured to provide the wide viewing angle image package to a wide viewing angle image display device;

wherein the planar reference image is transformed into a curved projection geometry by the wide viewing angle image display device, wherein the wide viewing angle image display device is configured to project the curved projection geometry to a virtual space, to dispose a virtual camera, to texture the input image to the curved projection geometry to compose a scene, to display the scene on the curved projection geometry, wherein the wide viewing angle image display device corrects the image that is already displayed on the curved projection geometry based on the correction parameter, wherein the correction parameter includes a camera intrinsic parameter or a stabilizing parameter, wherein the wide viewing angle image display device is configured to dynamically correct the scene by dynamically adjusting a location of the virtual camera by using the stabilizing parameter.

2. A wide viewing angle image display device for displaying a wide viewing angle image received from an apparatus that processed the wide viewing angle image, comprising:
- a second communication processor configured to receive an encoded wide viewing angle image package provided from a first communication processor of the apparatus, wherein the encoded wide viewing angle image package comprises the wide viewing angle image and a correction parameter; and
- a scene composing processor configured to decode the received wide viewing angle image package, to generate a curved projection geometry to be textured by the wide viewing angle image using the correction parameter and planar reference image, to project the curved projection geometry to a virtual space, to dispose a virtual camera, to texture the input image to the curved projection geometry to compose a scene and the scene that is already textured to the curved projection geometry is corrected based on the correction parameter, wherein the correction parameter is generated based on an analysis of the wide viewing angle image and the planar reference image,
- wherein the correction parameter includes a camera intrinsic parameter or a stabilizing parameter,
- wherein the scene composing processor is configured to dynamically correct the scene by dynamically adjusting a location of the virtual camera by using the stabilizing parameter.

3. The wide viewing angle image display device according to claim 2, further comprising a display processor configured to render and displaying the scene in real time.

4. The wide viewing angle image display device according to claim 2,
- wherein the camera is a stereo camera, and
- wherein the correction parameter further includes an inter-camera instrumental error correction parameter, a color correction parameter or an exposure correction parameter.

5. The wide viewing angle image display device according to claim 4, wherein the scene composing processor is configured to correct the scene by dynamically adjusting the virtual camera or a vertex of the projection geometry projected to the virtual space by using the inter-camera instrumental error correction parameter.

6. The wide viewing angle image display device according to claim 2, wherein the wide viewing angle image display device is a wearable device or a portable communication device.

7. A method for processing a wide viewing angle image, comprising:
- analyzing, by an apparatus for processing a wide viewing angle image, an image input from a camera and a planar reference image to generate a correction parameter based on the analysis of the image input and the planar reference image;
- encoding, by the apparatus, the input image and the correction parameter to generate a wide viewing angle image package;
- providing, by the apparatus, the wide viewing angle image package to a display device;
- decoding, by the display device, the wide viewing angle image package;
- generating, by the display device, a curved projection geometry to be textured by the wide viewing angle image using the correction parameter and the planar reference image;
- projecting, by the display device, the curved projection geometry to a virtual space, and disposing a virtual camera;
- texturing, by the display device, the input image to the curved projection geometry to compose a scene;
- correcting the scene that is already textured to the curved projection geometry based on the correction parameter, wherein the correction parameter includes a camera intrinsic parameter or a stabilizing parameter, and
- wherein the scene is corrected by the display device by dynamically adjusting a location of the virtual camera using the stabilizing parameter.

8. The method according to claim 7, wherein said generating of a geometry includes:
- correcting, by the display device, a vertex of a reference geometry or a texture coordinate by using the camera intrinsic parameter; and
- when the vertex of the reference geometry is corrected by the display device, transforming the corrected reference geometry into a curved shape to generate the curved projection geometry.

9. The method according to claim 7, further comprising analyzing the input image to extract metadata, wherein in said generating of a wide viewing angle image package, the metadata is further encoded.

10. The method according to claim 7, further comprising rendering and displaying, by the display device, the scene data in real time.

11. The method according to claim 7, wherein the input image is a stereo image input by a stereo camera, and wherein the correction parameter further includes an inter-camera instrumental error correction parameter, a color correction parameter or an exposure correction parameter.

12. The method of claim 1, wherein the reference image comprises a square monochrome grid pattern.

* * * * *